Patented July 21, 1931

1,815,775

UNITED STATES PATENT OFFICE

RICHARD HERZ, OF FRANKFORT-ON-THE-MAIN, AND WILHELM HECHTENBERG, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

2-(4'-HYDROXY-ARYL-AMINO)-ARYL-AMINO-NAPHTHALENES

No Drawing. Application filed August 16, 1929, Serial No. 386,481, and in Germany September 13, 1928.

Our present invention relates to new condensation products corresponding to the general formula:

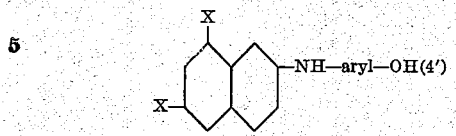

wherein one X means hydrogen, the other X an arylamino-group and wherein both aryl-residues may contain further substituents.

The new products are obtainable by treating an arylamino-hydroxy-naphthalene-carboxylic acid of the general formula:

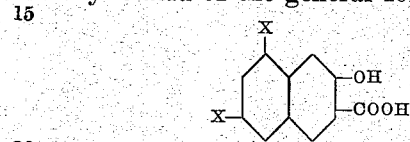

wherein X has the above signification, with a para-hydroxy-arylamine in the presence of sodium bisulfite solution. By this reaction the hydroxy-group of the naphthalene compound is replaced by a para-hydroxy-arylamino-group while the carboxylic group is simultaneously split off.

The arylamino-2-hydroxy-naphthalene-3-carboxylic acids used as starting material in this process may be prepared for instance by condensing a 2.6- or 2.8-dihydroxy-naphthalene-3-carboxylic acid with an aromatic amine in the manner described in U. S. application Serial No. 343,554, filed February 28, 1929.

In order to further illustrate our invention the following examples are given, the parts being by weight and all temperatures in centigrade degrees. We wish it however to be understood, that we are not limited to the particular conditions nor to the specific products mentioned therein.

Example 1

A mixture of 28 parts of 6-phenylamino-2-hydroxy-naphthalene-3-carboxylic acid and 16 parts of 4-amino-phenol is boiled under a reflux condenser with the addition of about 540 parts of a sodium bisulfite solution of 40° Bé. After about 50 hours the mass is cooled and the precipitate is filtered off and washed with water, acidified water and a dilute soda solution. The 2-(4'-hydroxyphenylamino)-6-phenylamino-naphthalene thus formed corresponds probably to the formula:

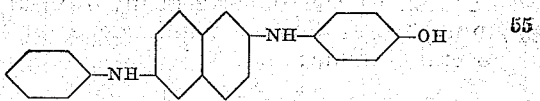

According to this formula it represents a leuco-amphi-quinone-imide. It crystallizes from alcohol in the form of brilliant greenish glistening leaflets of melting point 205°. It is easily soluble in hot alcohol, difficultly soluble in benzene.

When treated with an alkaline solution of hypochlorite or with a chromate in an acetic acid solution it yields a blue oxidation product having probably the constitution of an indophenol.

When 6-(4'-tolylamino-2-hydroxy-naphthalene-3-carboxylic acid is subjected to this process, 2-(4'-hydroxy-phenylamino)-6-(4''-tolylamino)-napthalene is obtained which shows similar properties as the above mentioned phenylamino-compound.

Also 4-amino-phenol may be replaced by other para-hydroxyarylamines as for instance 4-amino-2.6-dichloro-1-hydroxy-benzene.

Example 2

28 parts of 8-phenylamino-2-hydroxy-naphthalene-3-carboxylic acid and 16 parts of 4-amino-phenol are treated with sodium bisulfite as described in Example 1. In this manner 2-(4'-hydroxyphenylamino)-8-phenylamino-naphthalene of the probable formula:

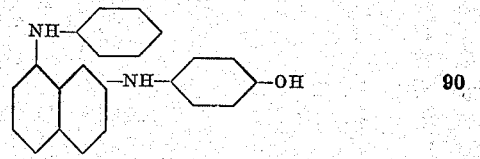

is obtained. This compound exhibits similar properties to that described in Example 1.

The process may also be carried out at a more elevated temperature about 120-140° in a closed vessel under pressure. In this case the duration of reaction is much shortened.

We claim:

1. As new compounds 2-(4'-hydroxy-arylamino)-arylamino naphthalenes of the general formula:

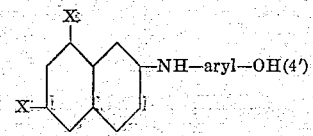

wherein one X means hydrogen, the other X an arylamino-group and wherein both aryl-residues are of the benzene series and may contain further substituents, which compounds are crystalline substances, having a definite melting point, being soluble in hot alcohol and capable of being transformed into blue compounds by means of oxidizing agents.

2. As new compounds 2-(4'-hydroxy-arylamino)-6-arylamino-naphthalenes of the general formula:

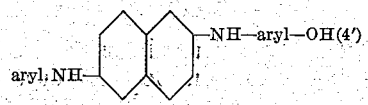

wherein both aryl-residues are of the benzene series and may contain further substituents, which compounds are crystalline substances, having a definite melting point, being soluble in hot alcohol and capable of being transformed into blue compounds by means of oxidizing agents.

3. As a new compound 2-(4'-hydroxyphenylamino)-6-phenylamino-naphthalene of the formula:

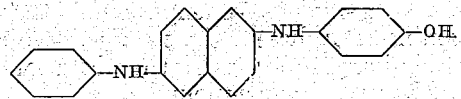

which compound crystallizes from alcohol in the form of brilliant greenish glistening leaflets, melting at 205°, being soluble in hot alcohol, difficultly soluble in benzene and being capable of being oxidized to form a blue product.

In testimony whereof, we affix our signatures.

RICHARD HERZ.
WILHELM HECHTENBERG.